United States Patent [19]

Sekimoto et al.

[11] Patent Number: 4,782,476
[45] Date of Patent: Nov. 1, 1988

[54] OBJECTIVE LENS-DRIVING UNIT

[75] Inventors: Yoshihiro Sekimoto; Toshihisa Deguchi, both of Nara; Mitsuo Ishii, Yamatokoriyama; Masaru Nomura, Tenri, all of Japan

[73] Assignee: Sharp Kabushiki Kaisha, Osaka, Japan

[21] Appl. No.: 65,285

[22] Filed: Jun. 22, 1987

[30] Foreign Application Priority Data

| Jun. 24, 1986 | [JP] | Japan | 61-147500 |
| Jul. 17, 1986 | [JP] | Japan | 61-168277 |
| Dec. 1, 1986 | [JP] | Japan | 61-286167 |
| Dec. 1, 1986 | [JP] | Japan | 61-286168 |

[51] Int. Cl.$^4$ ............................................. G11B 7/12
[52] U.S. Cl. ...................................... 369/45; 369/112; 360/114
[58] Field of Search ............... 369/44, 45, 46, 112; 250/201 DF; 350/247, 255, 6.3

[56] References Cited

U.S. PATENT DOCUMENTS

| 4,321,701 | 3/1982 | Arquie et al. | 369/45 |
| 4,574,369 | 3/1986 | Koide et al. | 369/45 |
| 4,658,390 | 4/1987 | Fujii et al. | 369/45 |
| 4,679,904 | 7/1987 | Kurihara | 369/45 |

FOREIGN PATENT DOCUMENTS

| 3510121 | 9/1985 | Fed. Rep. of Germany . |
| 3510122 | 9/1985 | Fed. Rep. of Germany . |
| 3514658 | 10/1985 | Fed. Rep. of Germany . |
| 3608269 | 9/1986 | Fed. Rep. of Germany . |
| 2159293 | 11/1985 | United Kingdom . |

Primary Examiner—Donald McElheny, Jr.
Attorney, Agent, or Firm—Ciotti & Murashige, Irell & Manella

[57] ABSTRACT

An objective lens-driving unit comprising a lens supporting means for supporting the objective lens having an optical axis vertical to a recording medium on which light beams converge through the objective lens so as to attain optical recording, optical playing and optical erasing of information on the recording medium; at least one driving means for driving said lens supporting means in the tracking direction; a driving means for driving said intermediate supporting means in the focusing direction, wherein said tracking direction-driving means comprises a magnetic circuit that produces magnetic flux in the circumferential direction of the recording medium, and a tracking direction-driving coil that is positioned to cross a gap formed in the magnetic circuit to thereby receive an electro-magnetic force due to an interaction between the magnetic field of the magnetic circuit and the current passing through said coil, said tracking direction-driving coil being positioned within the excitation area of the magnetic circuit even when said coil moves in the focusing direction.

7 Claims, 21 Drawing Sheets

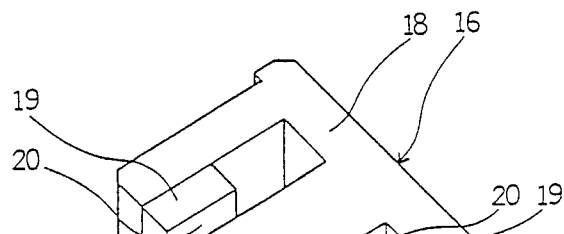
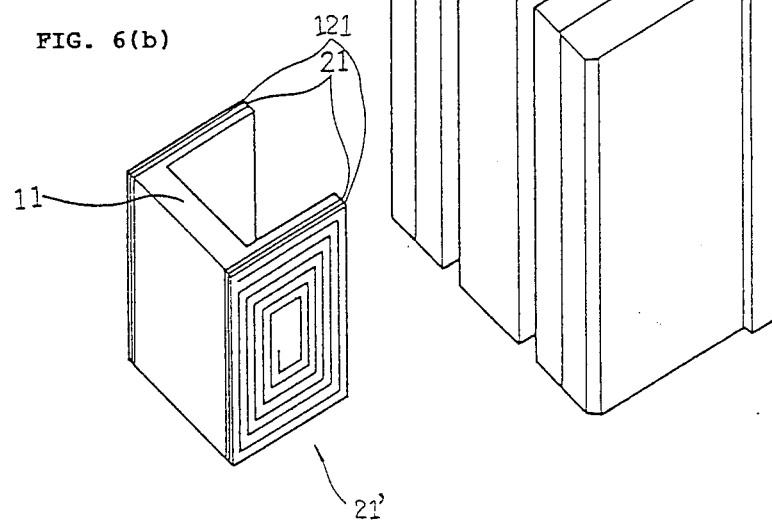

OBJECTIVE LENS-DRIVING UNIT

BACKGROUND OF THE INVENTION

1. Field of the Invention

This invention relates to a unit for driving an objective lens in an optical disk apparatus by which light beams such as laser beams always converge on a recording medium through the objective lens, thereby attaining optical recording, optical playing, and optical erasing of information on the recording medium.

2. Description of the Prior Art

FIG. 17 shows a conventional magneto-optical disk apparatus in which an optical disk 600 is turned by a motor 900, and a laser beam 400 from a laser light source 300 is reflected by a mirror 500 and then converges on the surface of a recording medium 606 included in the magneto-optical disk 600 via an objective lens 200 thereby attaining playing, erasing and writing of information thereon. The objective lens 200 is moved in the direction vertical to the surface of the recording medium 606 of the magneto-optical disk 600 (i.e., the focusing direction) or in the radical direction of the magneto-optical disk 600 (i.e., the tracking direction) by a unit 100 for driving the objective lens in such a manner that the laser beam 400 passing through the objective lens 200 can always converge on the recording track of the recording medium 606. The above-mentioned optical system is contained within an optical head 700. As shown in FIG. 18, the objective lens-driving unit 100 is provided with a supporting means 110 for supporting the objective lens 200, e.g., a cylindrical holder, which is movable in the focusing direction or the direction of arrow y (i.e., in the direction of the optical axis of the objective lens 200) with the below-mentioned intermediate supporting means 130. The cylindrical holder 110 is fixed to the intermediate supporting means 130 by a pair of parallel springs 120 that are movable in the tracking direction or the direction of arrow x (i.e., in the direction of the radius of the disk 600). An elastic substance 140 is disposed inside of each of the springs 120. A counterbalance 160 is positioned outside of the lower portion of the cylindrical holder 110.

A pair of magnetic circuits 160 are fixed to the housing 170 of the objective lens-driving unit 100 in such a manner that they are symmetrical with regard to the optical axis of the objective lens 200. Each of the magnetic circuits 160 is composed of a yoke 180 and a magnet 190 and a yoke plate 166. The yoke plate 166 and the yoke 180 form a gap 220 therebetween. A coil 210, one end of which is fixed to the cylindrical holder 110, is positioned within the gap 220.

Thus, when current applied to the above-mentioned coil 210 is changed, an electromagnetic force is created to move the coil 210 such that displacement of both the cylindrical holder 110 and the objective lens 200 supported by the cylindrical holder 110 in the tracking direction can be achieved.

On the other hand, a driving means 299 for driving the objective lens 200 in the focusing direction is placed downward of the above-mentioned intermediate supporting means 130. The driving means 299 is composed of a magnetic circuit 250 composed of a magnet 270, yoke plate 260, yoke 280, and a coil 300, one end of which is fixed to the lower end of the intermediate supporting means 130 and which is positioned within a gap 290 formed between the yoke plate 260 and the yoke 280. The intermediate supporting means 130 is supported by a pair of springs 230 such as circular leaf springs in a manner to be movable in the focusing direction. An elastic substance 240 is disposed on the springs 230.

In the conventional objective lens-driving unit 100 with the above-mentioned structure, if the stiffness in the focusing direction of each spring 120 that is movable in the tracking direction and the stiffness in the tracking direction of each spring 230 that is movable in the focusing direction are insufficient, and/or if the center G of gravity of the movable portion 111 for driving the objective lens 200 in the tracking direction comprising the objective lens 200, the objective lens-supporting means 110 and the coil 210 is displaced from the center C of the movable portion 111 at which the driving force in the tracking direction acts, the movable portion 111 will turn around its center G of gravity, causing turning of a movable portion 222 for driving the movable portion 111 in the focusing direction, which comprises the intermediate supporting means 130 and the coil 300, via the parallel springs 120, so that rotation resonance arises in the springs 120, which causes distortion in the frequency characteristics of the magneto-optical disk apparatus. This becomes trouble-some in the servomechanism of the said magneto-optical disk apparatus. In order to remove such a problem, the center G of gravity of the movable portion 111 must be adjusted by use of a counterbalance 150 so as to match the center C of the movable portion 111 at which the driving force in the tracking direction acts.

However, when a rectangular magnetic circit is used as the magnetic circuit 160 as shown in FIG. 19, the objective lens-supporting means 110 vibrates, due to the deflection of the parallel springs 230, in the focusing direction so that the gap 183 formed between the yoke 180 and the yoke plate 181 must be made sufficiently large so as to permit the coil to move freely within the gap 183, causing lack of uniformity in the magnetic flux density therein. Thus, depending upon the positions of the upper portion 211 and the lower portion 212 of the coil 210 in the focusing direction within the gap 183, a difference arises between the driving force produced to move the upper portion 211 of the coil 210 in the tracking direction and the driving force produced to move the lower portion 212 of the coil 210 in the tracking direction, which causes a displacement of the center of the movable portion 111 at which the driving force in the tracking direction acts.

Moreover, since the width $d_1$ of the coil 210 is greater than that of the fixed magnetic field represented by the width $d_2$ of the yoke plate 181, the center of movable portion 111, at which the driving force that is created in the tracking direction acts, depends upon the position of the magnetic circuit. However, the center of gravity of the movable portion 111 that is movable in the tracking direction moves up and down with a displacement of the movable portion 222 that is movable in the focus direction, resulting in a displacement of the center of gravity of the movable portion 111 from the center of the movable portion 111 at which the driving force created in the tracking direction acts, so that a turning rotation resonance will arise in the springs 120. In order to prevent such a resonance, even if the movable portion 111 is balanced by a counterbalance 150, the movement of the movable portion 111 in the tracking direction when the movable portion 222 in the focusing direction is lifted is opposite to that of the movable portion 111 in the tracking direction when the movable portion 222 is lowered, so that such a turning resonance will unavoidably occur.

A coil that attains a feedback control of the velocity of the coils 210 can be used in the objective lens-driving unit 100. For this purpose, one of the two coils 210 is used for driving the movable portion 111 in the tracking direction and the other is used for the feedback control of the velocity thereof such that the output power for the feedback control coil is returned to the said tracking-direction driving coil via an appropriate circuit, which causes an enlargement of the size of the unit 100.

FIG. 21 is a partly cross-sectional view of the conventional objective lens-driving unit 100 shown in FIG. 18, in which four lead wires 901 which are a part of the tracking-direction driving coils 210 to supply electrical power to the tracking-direction driving coils 210, are led to the outside of the unit 100 through the hole 171 of the housing 170. Parts of the focusing-direction driving coils 300 are also used as lead wires 902 through which electrical power is supplied to the focusing-direction driving coils 300, and each lead wire 902 is led to the outside of the unit 100 through the hole 171 of the housing 170. Since the wires are exposed to the outside, there is a possibility that they will be damaged, causing difficulties in maintenance.

On the other hand, a velocity-detecting apparatus using an electro-magnetic coil therein has been proposed, in which, if a coil for driving the said coil in a certain direction is also used as a coil for detecting the velocity of the said driven coil, the velocity-detecting coil cannot be used as a driving coil (or a driven coil) during the detection of velocity, and accordingly current for driving the driving coil and current for detecting the velocity of the driven coil must be separately supplied to these coils, which causes complexity in the structure of the velocity-detecting apparatus and increases the production cost of this apparatus.

Therefore, when this velocity-detecting apparatus is incorporated into the above-mentioned conventional objective lens-driving unit, the unit becomes complex and expensive.

SUMMARY OF THE INVENTION

The objective lens-driving unit of this invention, which overcomes the above-discussed and numerous other disadvantages and deficiencies of the prior art, comprises a lens supporting means for supporting the objective lens having an optical axis vertical to a recording medium on which light beams converge through the objective lens so as to attain optical recording, optical playing and optical erasing of information on the recording medium; an intermediate supporting means for supporting said lens supporting means by use of springs that are movable in the tracking direction; a fixed supporting means for supporting said intermediate supporting means by use of springs that are movable in the focusing direction; at least one driving means for driving said lens supporting means in the tracking direction, said tracking direction-driving means being positioned between said fixed supporting means and said lens supporting means; a driving means for driving said intermediate supporting means in the focusing direction, said focusing direction driving means being positioned between said fixed supporting means and intermediate supporting mens, wherein said tracking direction-driving means comprises a magnetic circuit that produces magnetic flux in the circumferential direction of the recording medium, and a tracking direction-driving coil that is positioned to cross a gap formed in the magnetic circuit to thereby receive an electro-magnetic force due to an interaction between the magnetic field of the magnetic circuit and the current passing through said coil, said tracking direction-driving coil being positioned within the excitation area of the magnetic circuit even when said coil moves in the focusing direction.

In a preferred embodiment, the focusing direction driving means comprises a magnetic circuit with a gap and a focusing direction-driving coil positioned to cross said gap to thereby receive an electro-magnetic force in the focusing direction due to an interaction between the magnetic field of the magnetic circuit and the current passing through said coil.

In a preferred embodiment, a velocity-detecting coil is laid upon said tracking direction-driving coil and/or said focusing direction-driving coil, thereby attaining the detection of the velocity of the driving of the tracking direction-driving coil and/or the focusing direction-driving coil.

In a preferred embodiment, at least one flexible printed circuit is disposed on said fixed supporting means in such a manner that one end of the flexible printed circuit is exposed to the outside of the fixed supporting means, lead wires led from at least one selected from said tracking direction-driving coil and said focusing direction-driving coil being connected to said flexible printed circuit and wires through which current is supplied to said coil being connected to said exposed portion.

In a preferred embodiment, the portion(s) of at least one selected from said lens supporting means, said intermediate supporting means and said fixed supporting means, to which one end or both ends of each of said springs is fixed, is separable into two parts. At least one end of each of said springs are fixed to at least one of said supporting means by an adhesive in a manner to be positioned between the two parts.

Thus, the invention described herein makes possible the objects of (1) providing an objective lens-supporting unit in which, since the length of each of the tracking direction-driving coils is set to be smaller than that of the magnetic circuit, each coil is always positioned within the excitation area of the magnetic circuit even when the coil moves in the focusing direction, and moreover the occurrence of a turning resonance resulting from an interference between the force to drive an objective lens in the focusing direction and the force to drive the objective lens in the tracking direction can be prevented, attaining frequency characteristics without deflection, thereby attaining a stable servomechanism; (2) providing an objective lens-driving unit which supplies a structure to simultaneously attain the production of an electro-magnetic force for driving coils and the detection of velocity of the driven coils, so that a miniaturization of the unit can be achieved; (3) providing an objective lens-driving unit in which coiled wires are not exposed to the outside, so that damage can be minimized; (4) providing an objective lens-driving unit in which hollows where springs for the movement of the objective lens in the focusing direction and/or in the tracking direction are held therein can be formed with accuracy at the interface between the two separable parts of spring-supporting means in accordance with the sizes of the springs, so that the thickness of adhesive layers by which the springs are fixed into the hollows can be minimized, which allows for an improvement of the spring constant of each spring, resulting in a stable servomechanism; and (5) providing an objective lens-driving unit in which the thickness of the adhesive layers can be minimized as mentioned above, which maximizes the adhesive strength of the adhesives between each spring and the spring-supporting means.

BRIEF DESCRIPTION OF THE DRAWINGS

This invention may be better understood and its numerous objects and advantages will become apparent to those skilled in the art by reference to the accompanying drawings as follows:

FIGS. 6(a) and 6(b), respectively, are perspective views showing the magnetic circuit and the coils used for the unit shown in FIG. 4.

DESCRIPTION OF THE PREFERRED EMBODIMENTS

EXAMPLE 1

Figure 1:
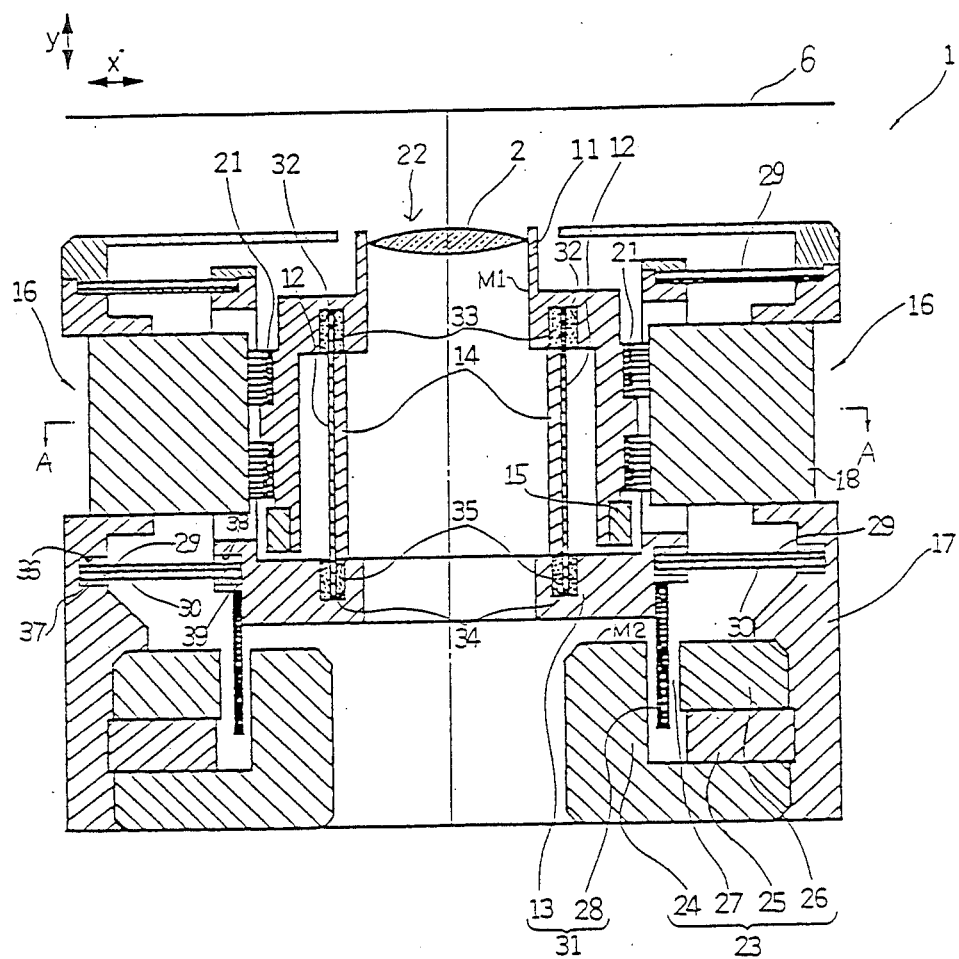
FIG. 1 is a side sectional view showing an objective lens-driving unit of this invention.

FIG. 1 shows an objective lens-driving unit 1 of this invention which comprises a first control means M1 for controlling the movement of an objective lens 2 in the direction of the radius of an magneto-optical disk 6 (i.e., the tracking direction x) and a second control means M2 for controlling the movement of the objective lens 2 in the direction of the focusing of a laser beam on the disk 6 by the objective lens 2 (i.e., the focusing direction y).

The first control means M1 comprises an objective lens-supporting means 11 such as a cylindrical holder, a pair of parallel leaf springs 12 disposed symmetrically with regard to the optical axis of the objective lens 2, and an intermediate supporting means 13 for supporting the objective lens-supporting means 11 by the springs 12 in such a manner that the objective lens-supporting means 11 is movable in the tracking direction x. An elastic substance 14 by which the vibration of springs can be absorbed is fixed to the inner wall of each spring 12. A circular counterbalance 15 is disposed on the outer surface of the lower portion of the objective lens-supporting means 11.

Figure 2:
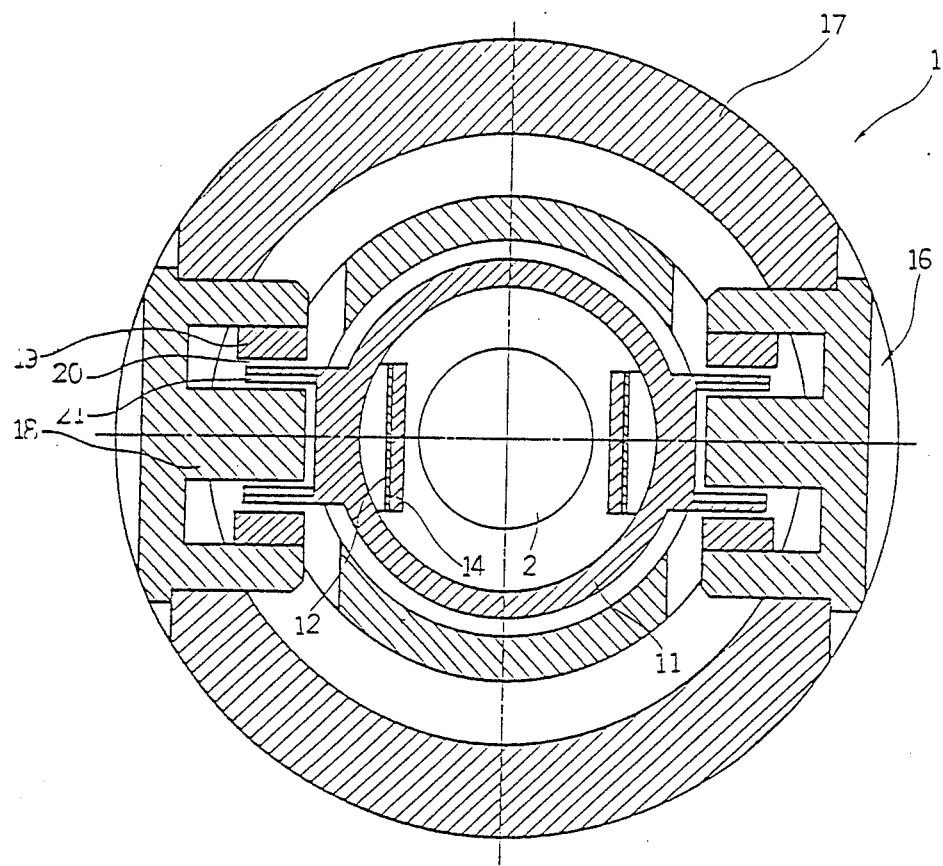
FIG. 2 is a cross sectional view taken on line A—A of FIG. 1.
Figure 3:
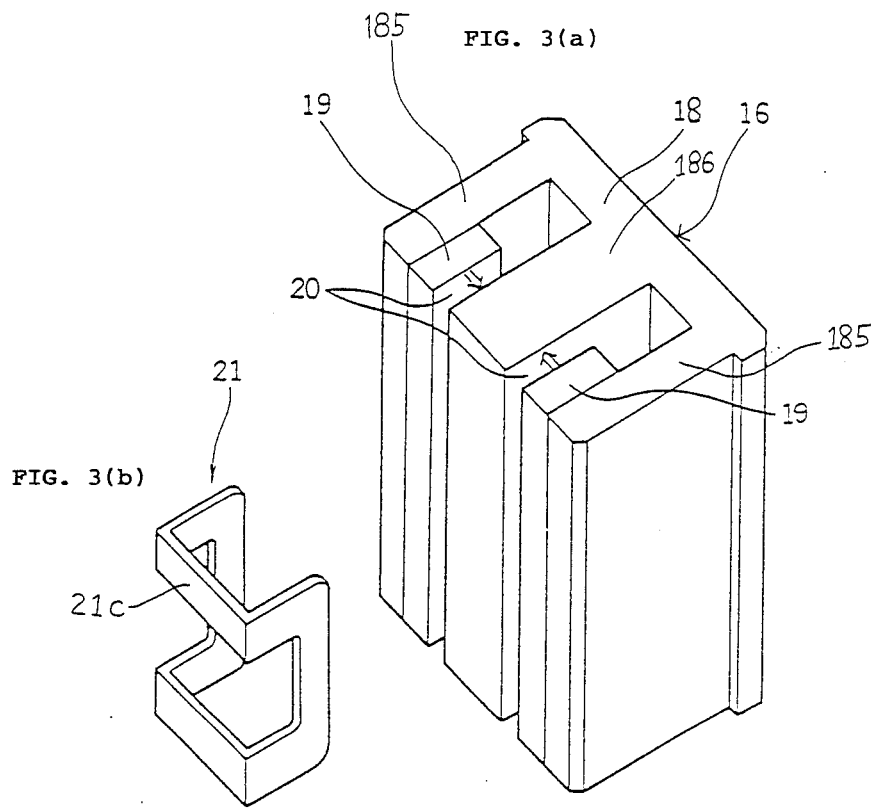
FIGS. 3(a) and 3(b), respectively, are perspective views showing the magnetic circuit and the coils used for the unit shown in FIG. 1.

The first control means M1 further comprises, as shown in FIGS. 1 to 3, a pair of magnetic circuits 16 each of which is composed of a W-shaped yoke 18 and permanent magnets 19 fixed to both side arms 185 of the yoke 18. The yoke 18 is fixed to a fixed supporting means such as the housing 17. The magnets 19 are magnetized in the tangential direction (i.e., the circumferential direction of the disk 6). A space 20 is formed between the magnet 19 and the central arm 186 of the yoke 18. A coil 21, which is formed into a C-shape not only in the plane view but also in the side view, is incorporated into the yoke 18 such that each of both side ends of the coil 21 is inserted within the gap 20. The length of the coil 21 in the focusing direction y is set to be smaller than than of the gap 20 in the focusing direction y. That is, the length and the position of the coil 21 is set such that the coil 21 should be included within the excitation area of the magnetic circuit 16. The back face 21c of the coil 21 is fixed to the above-mentioned objective lens-supporting means 11. The coil 21 and the magnetic circuit 16 constitute a driving means for driving the objective lens 2 in the tracking direction x.

When current flows through each coil 21, a movable portion 22 composed of the coil 21, the objective lens 2, the objective lens-supporting means 11 and the counterbalance 15 is displaced in the tracking direction x due to the electro-magnetic force created by an interaction between the electric field of the magnets 19 and the current of the coil 21. Since the coil 21 is constructed such that it is positioned within the excitation area of the magnetic circuit 16, the position at which the driving force acts against the movable portion 22 can be fixed independently of the position of the center of gravity of the movable portion 22. The position of the center of gravity of the movable portion 22 is adjusted by the counterbalance 15 in such a manner that it conforms to or is placed slightly below the position at which the driving force acts against the movable portion 22, so that the occurrence of a turning resonance of the movable portion 22 in the direction that the occurrence of a response phase between the input signal and the movement of the objective lens on the disk 6 can be prevented, and stable transmission characteristics of the movable portion 22 can be attained.

The above-mentioned second control means M2 for controlling the objective lens 2 in the focusing direction y comprises a pair of parallel leaf springs 29 disposed symmetrically with regard to a vertical line to the optical axis of the objective lens 2, the above-mentioned intermediate supporting means 13 that also supports the springs 29, a magnetic circuit 23 and a coil 28. The magnetic circuit 23 comprises a yoke 24, a permanent magnet 25 and a yoke plate 26 fixed to the lower portion of the inner wall of the housing 17. The coil 28, one end of which is fixed to the intermediate supporting means 13, is disposed into the magnetic circuit 23 such that it is positioned within a space 27 formed between the yoke plate 26 and the yoke 24. The coil 28 and the magnetic circuit 23 constitute a driving means for driving the objective lens 2 in the focusing direction y.

One end of each of the parallel leaf springs 29 is fixed to the above-mentioned intermediate supporting means 13 and the ther end thereof is fixed to the housing 17, so that the intermediate supporting means 13 is movable in the focusing direction alone. An elastic substance 30 is fixed to one surface of each of the springs 29.

When current flows through the coil 28, a movable portion 31 that is composed of the coil 28 and the intermediate supporting means 13, and the above-mentioned movable portion 22 that is supported by the parallel springs 12 are displaced in the focusing direction alone.

Even though the movable portion 22 is displaced in the focusing direction, the coil 21 is maintained within the excitation area of the magnetic circuit 16 such that the whole area of the coil 21 in the focusing direction crosses the magnetic flux of the magnetic circuit 16. Accordingly, the position at which the driving force acts against the movable portion 22 is unchangeable, and by the adjustment of the position of the counterbalance 15, the position of the center of gravity of the movable portion 22 can be adjusted to conform to or be positioned slightly below the position at which the driving force acts against the movable portion 22, so that the occurrence of turning resonance of the movable portion 22 in the direction that the occurrence of a response phase between the input signal and the movement of the objective lens on the disk 6 can be prevented and stable transmission characteristics of the movable portion 22 can be attained.

EXAMPLE 2

Figure 4:
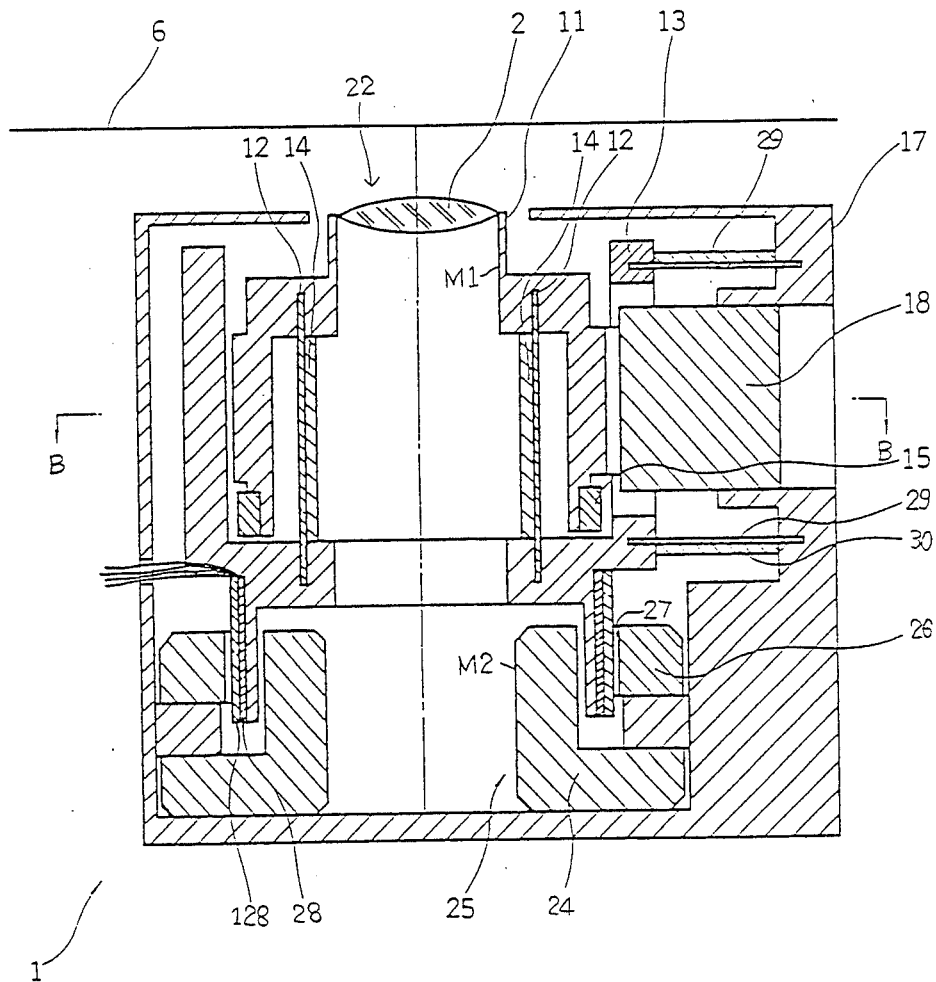
FIG. 4 is a side sectional view showing another unit of this invention.
Figure 5:
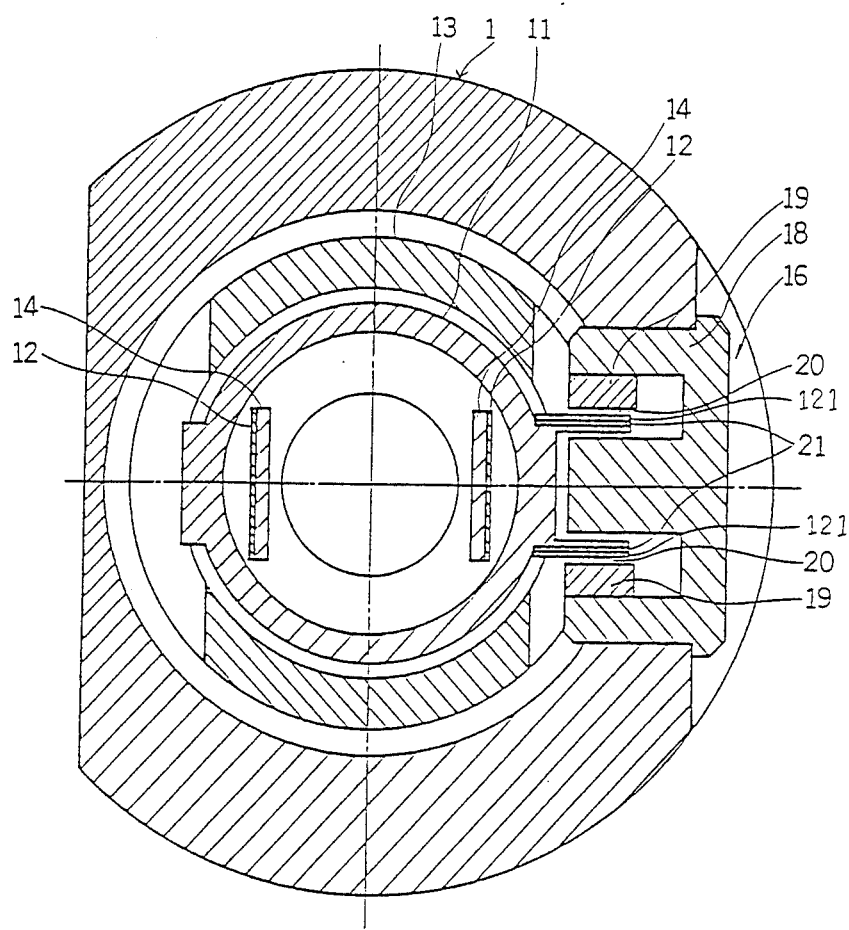
FIG. 5 is a cross sectional view taken on line B—B of FIG. 4.
Figure 17:
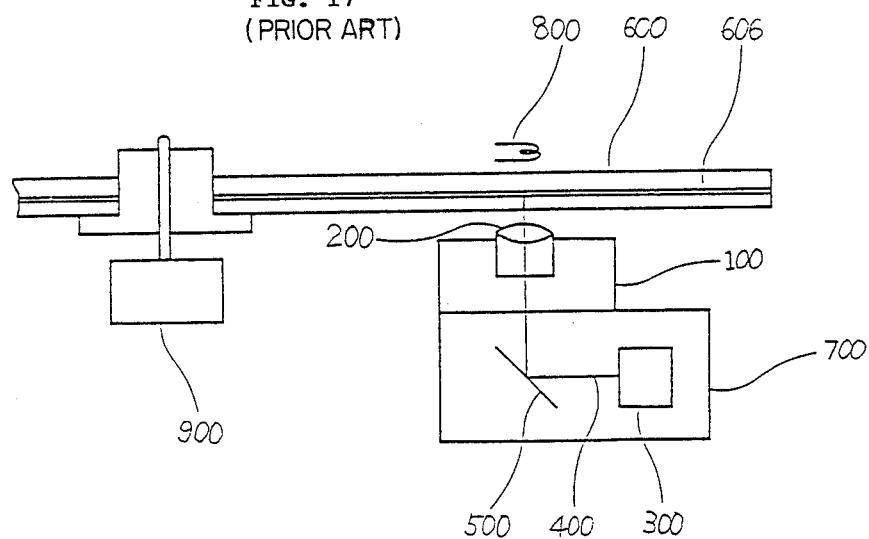
FIG. 17 is a schematic diagram showing a magneto-optical disk apparatus.

FIGS. 4 and 5 show another objective-lens driving unit 1 of this invention, wherein a coil 121, which is used for feedback control of the velocity of the movement of the movable portion 22 in the tracking direction, is disposed on the coil 21 that is used to move the movable portion 22 in the tracking direction, enabling the elimination of a pair of coils 21 positioned symmetrically with regard to the optical axis of the objective lens 2. As a result, the structure on the side of the unit 1 that is opposite the feedback control coil side can be simplified, and the motor 900 shown in FIG. 17 can be incorporated into the said simplified area, which makes this unit 1 compact.

The above-mentioned coil 121 also works as a coil to drive the movable portion 22 in the tracking direction when the recording or playing of information is carried out on the disk 6, whereas it works as a coil for feedback control when the objective lens 2 has access to a certain track at a high speed.

The control means M1 for controlling the movement of the objective lens 2 in the tracking direction is supported by a pair of parallel leaf springs 29 at both their upper portion and lower portion on one side thereof, so that the inclination of the control means M1 to the optical axis of the objective lens 2 can be prevented even when the movable portion 22 is moving in a certain direction.

The laminated coil composed of the coils 21 and 121 can be made by winding lead wires so that the flat coil is formed. Alternatively, it can be easily made of a flexible printed circuit by an etching technique with excellent workability.

Figure 7A:
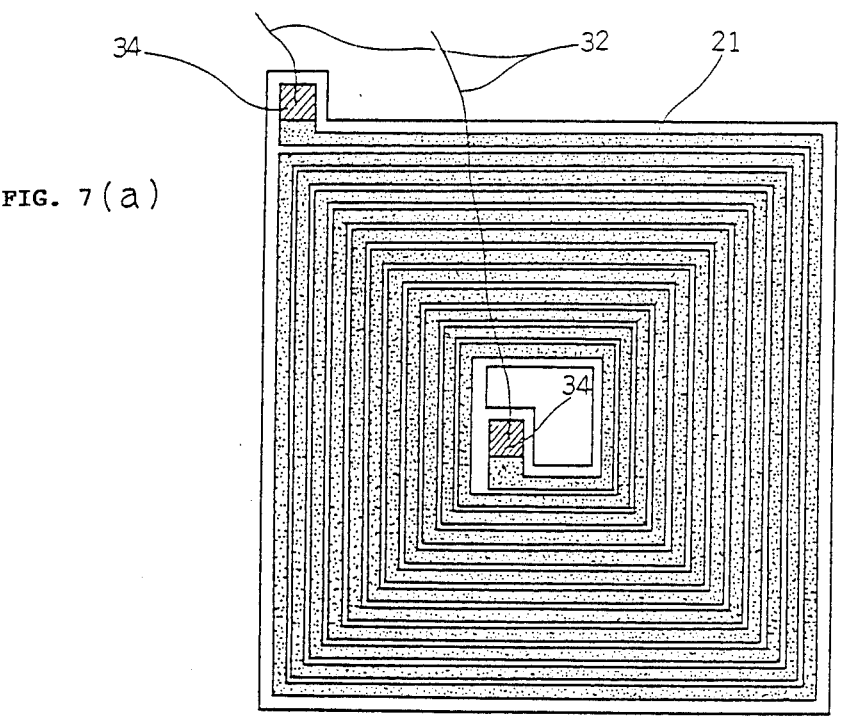
FIGS. 7(a) and 7(b), respectively, are plane views showing the coils shown in FIG. 6(b).

One of the coiled layers is used as a coil for the driving of the movable portion 22 in the tracking direction. The other coiled layer can be used as a coil for the detection of the driving velocity of the movable portion 22 in the tracking direction and this used, as desired, as a coil for the control of the driving velocity of the movable portion 22 thereby increasing the stiffness of the servosystem of this unit 1 against vibration resulting from external force. FIG. 6(b) shows a pair of laminated coils 21' composed of the coils 21 and 121, which are made of flexible printed circuits as mentioned above. Each laminated coil 21' is attached to the lens supporting means 11. When the coils 21 and 121 constituting each of the laminated coils 21' are different in use, both ends of each of them are connected to lead wires. The coil shown in FIG. 7(a) is an example of the coil 21 that is prepared as follows: On one surface of a flexible board, a desired pattern is formed by an etching technique, etc., resulting in the coil 21. Both ends 34 of the coil 21 are connected to thin lead wires 32 by means of solder. Such a coiled pattern can be also applied to the coil 121.

Figure 7B:
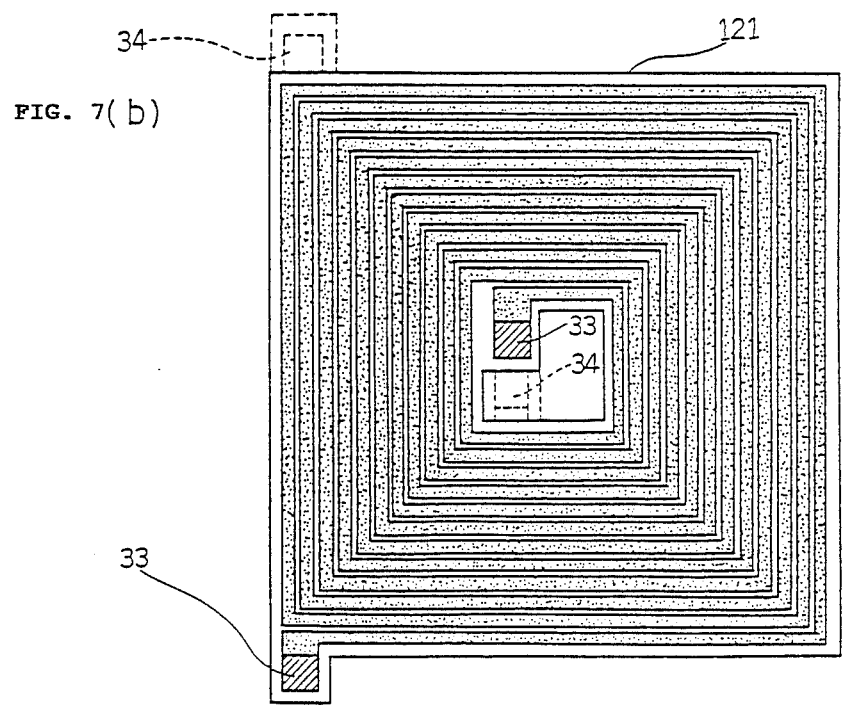

The lead wire configuration shown in FIG. 7(a) causes an interference between these lead wires and moreover causes difficulties in distinguishing one from the other when the coils 21 and 121 are employed for different uses. In order to solve these problems, it is desirable to make a difference between the patterns of the end portions of the coils 21 and 121, to which the lead wires are connected, as shown in FIG. 7(b) in which the end portions 34 of the coil 21 are different in their position in the direction of the thickness of these coils from the end portions 33 of the coil 121, so that these coils can be readily distinguished from each other.

The above-mentioned electro-magnetic coils for the driving of the movable portion 22 in the tracking direction and for the control of the driving velocity of the movable portion 22 are, of course, applicable to the coils for the driving of the movable portion 22 in the focusing direction and for the control of the driving velocity of the movable portion 22.

Figure 8:
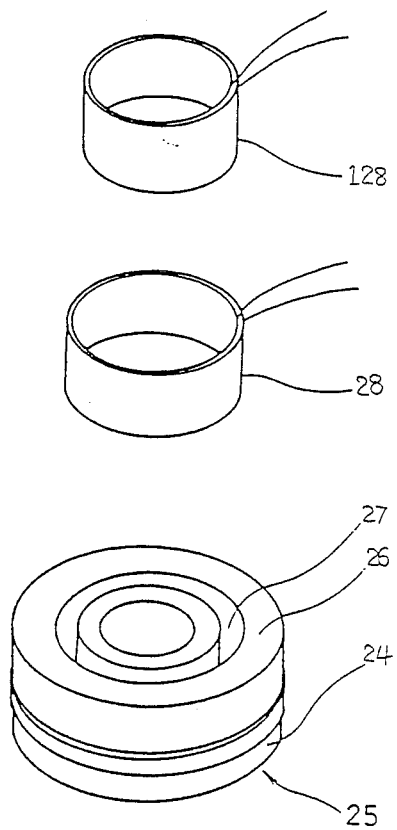
FIG. 8 is a perspective view showing the decomposed parts of a driving means used for the unit shown in FIG. 4.
Figure 9A:
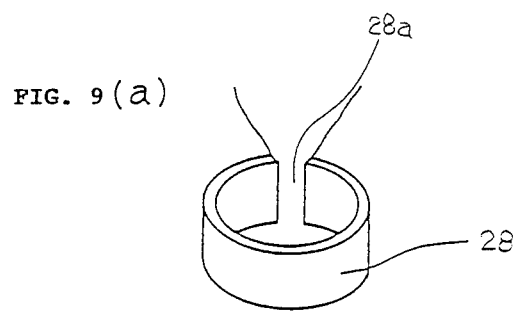
FIGS. 9(a) and 9(b), respectively, are a perspective view showing another coil used for the unit shown in FIG. 4 and a development of the coil shown in FIG. 9(a).
Figure 9B:
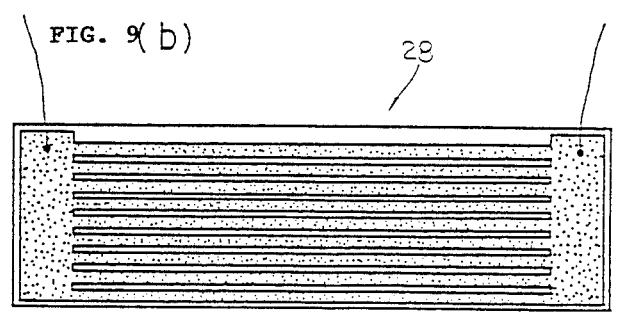

FIG. 8 is a perspective view showing the component parts of a driving means for the driving of the movable portion 22 in the focusing direction, in which said driving means is composed of a cylindrically wound coil 28 for the driving of the movable portion 22 in the focusing direction, a cylindrically wound coil 128 for the feedback control of the driving velocity of the movable portion 22 in the focusing direction, and a magnetic circuit 25. The coils 28 and 128 are concentrically positioned within the gap 27 of the circuit 25 as shown in FIG. 4. For this coil structure, the flat coil or the flexible printed circuit such as that in the tracking direction-driving coil can be used. Instead of a cylindrically wound coil structure, the coil can be formed using a sheet-type flexible printed circuit. In the event that the coil 28 is, for example, formed by use of a flexible printed circuit, it should be made without part 28a thereof, which is redily made as be seen from the development of the said coil 28 shown in FIG. 9(b).

Lead wires are connected to the coils for the driving of the movable portion 22 in the focusing direction in the same manner as those to the above-mentioned coils for the driving of the movable portion 22 in the tracking direction.

The velocity feedback is described below:

Given that the weight of the movable portion 22 shown in FIGS. 4 and 5, which comprises the coils 21 and 121, the objective lens 2, the objective lens-supporting means 11 and the counterbalance 15, is m, and the decrement and the elastic modules of the composite made of the parallel leaf springs 12 and the elastic substance 14 are d and k, respectively, the equation of motion at the time when external force is not added to the movable portion 22 can be represented below by Laplace transform:

$$(ms^2+ds+k)x_2 = (ds+k)x_1 \quad (1)$$

wherein $x_1$ is the Laplace transform of the displacement in the tracking direction of the intermediate supporting means 13 that supports the said movable portion 22, and $x_2$ is the Laplace transform of the displacement in the tracking direction of the movable portion 22.

When the movable portion 22 moves depending upon the movement of the intermediate supporting means 13, the displacement $x_2$ of the movable portion 22 should not conform to the displacement $x_1$ of the intermediate supporting means 13 arising from external vibration, but a relative displacement $(x_1-x_2)$ must arise therebetween. Accordingly, the equation (1) can be represented below by a transmission function of $(x_1-x_2)$ to $x_1$:

$$(x_1 - x_2)/x_1 = ms^2/(ms^2 + ds + k) \quad (2)$$
$$= s^2/(s^2 + 2\zeta\omega_0 s + \omega_0^2)$$

wherein $\omega_0^2 = k/m$ and $\zeta = d/(2\sqrt{mk})$ so that the damping numbers $\zeta$ are constant and depend upon the values d, m and k.

On the other hand, the equation of motion, in the event that differentiation of the relative displacement $(x_1-x_2)$ with respect to time (i.e., the relative velocity) is detected and amplified so as to transmit to the driving coils, is represented below if gain of the velocity feedback system is a:

$$[ms^2+(d+a)s+k]x_2 = [(d+a)s+k]x_1 \quad (3)$$

Accordingly, $$(x_1 - x_2)/x_1 = ms^2/[ms^2 + (d + a)s + k] \quad (4)$$
$$= s^2/(s^2 + 2\zeta'\omega_0 s + \omega_0^2)$$

wherein $\omega_0 = k/m$ and $\zeta' = (d+a)/(2\sqrt{mk})$ so that the damping numbers $\zeta'$ can be changed by the gain a of the velocity feedback system. Especially, when $\zeta' \geq 1$, the denominator of the equation (4) is unvibrational so that the resonance of the movable portion 22 due to external vibration does not arise thereby increasing the stiffness of the servosystem. Moreover, free vibration of the movable portion 22 arising while access of the laser beam has access to the disk 6 through the objective lens 2 can be suppressed.

The above-mentioned example only discloses the case in which this invention is applied to coils used to drive the objective lens in the tracking or focusing direction, but this invention is, of course, applicable to any electro-magnetic coil structure that necessitates a driving coil to be displaced due to electro-magnetic force within the gap in a magnetic circuit and a velocity-detecting coil for detecting the velocity of the driving coil.

As mentioned above, the objective lens-driving unit of Example 2 is provided with a laminated coil that is composed of a driving coil to be displaced due to electro-magnetic force within the gap in a magnetic circuit and a velocity-detecting coil for detecting the velocity of the said driving coil, so that the size of this unit can be made much smaller than that of a conventional unit in which a driving coil and a velocity-detecting coil are separately disposed. However, in the unit of Example 2, the driving coil and the velocity-detecting coil function in their own role alone, so that the driving of the coil can be easily controlled and the velocity of the driving of the coil can be easily detected, which allows for an increase in accuracy of driving the coil, an increase in accuracy of detection of the driving velocity of the coil, and a decrease in the production cost of the unit. Moreover, when coils made by the use of flexible printed circuits having different patterns are layered resulting in a laminated coil, the simplicity of the wiring process for the laminated coil is increased.

Example 3

Figure 10A:
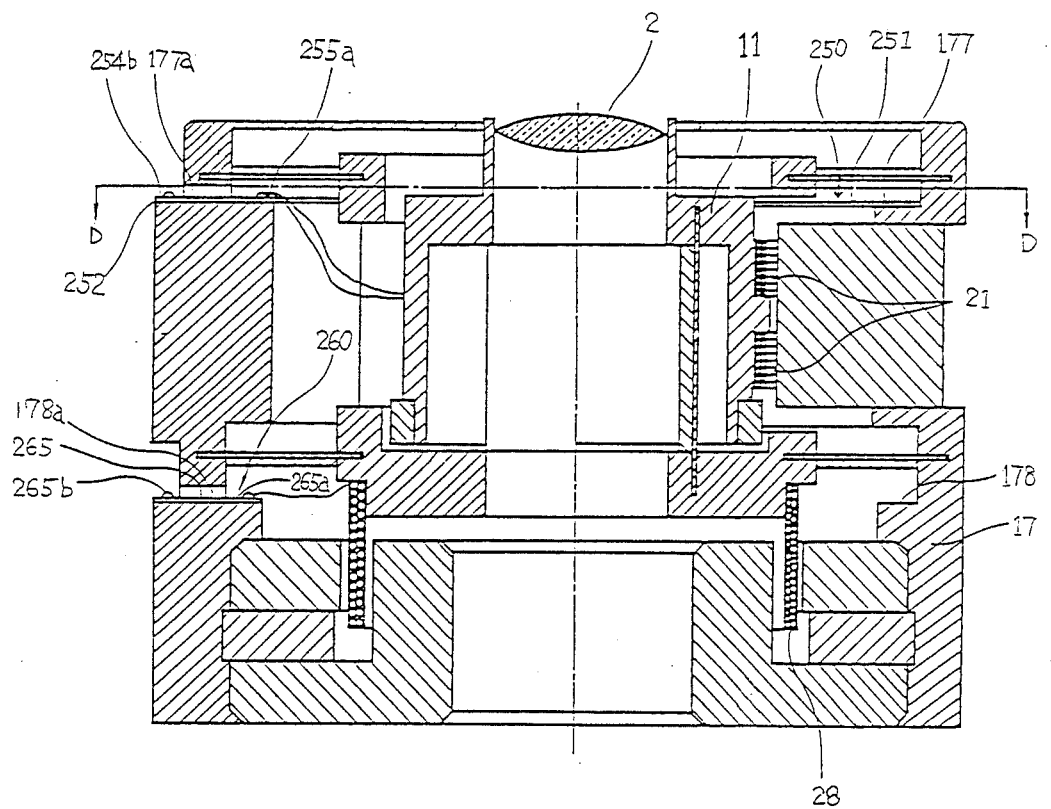
FIGS. 10(a) and 10(b), respectively, are a side sectional view showing another objective lens-driving unit of this invention and a cross sectional view taken on line D—D of FIG. 10(a).
Figure 10B:
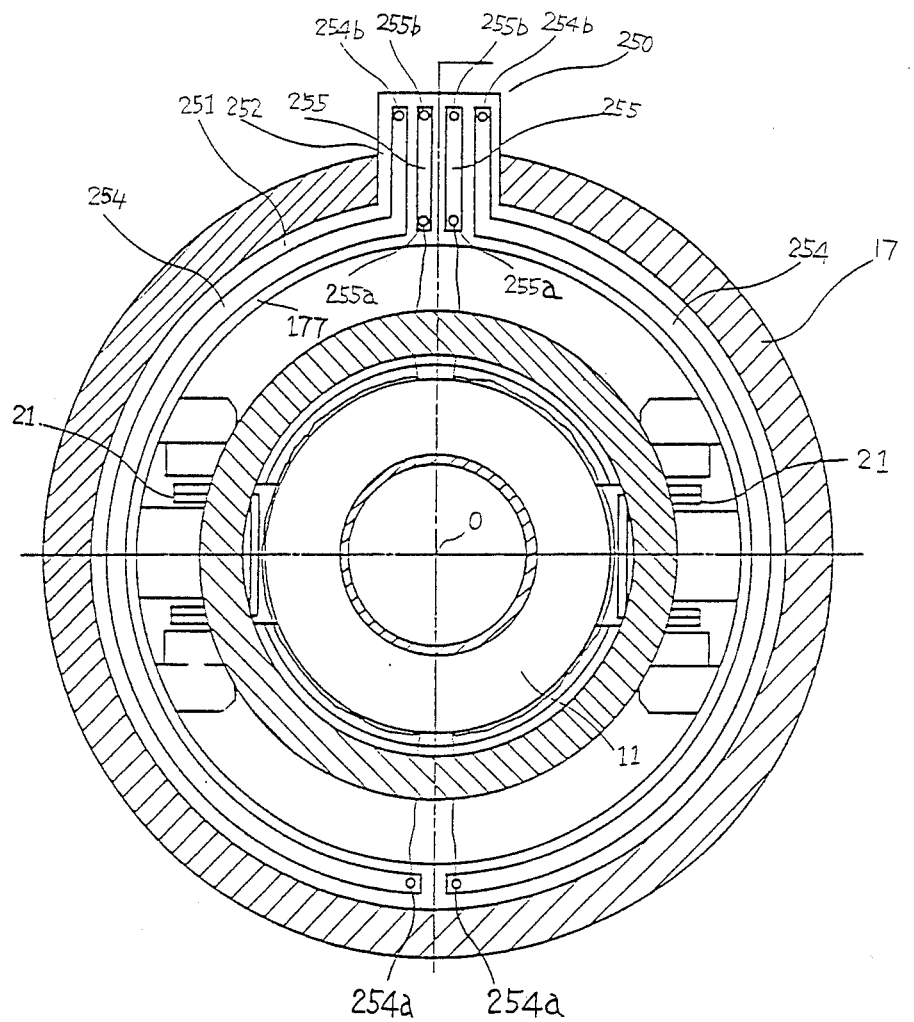
Figure 11:
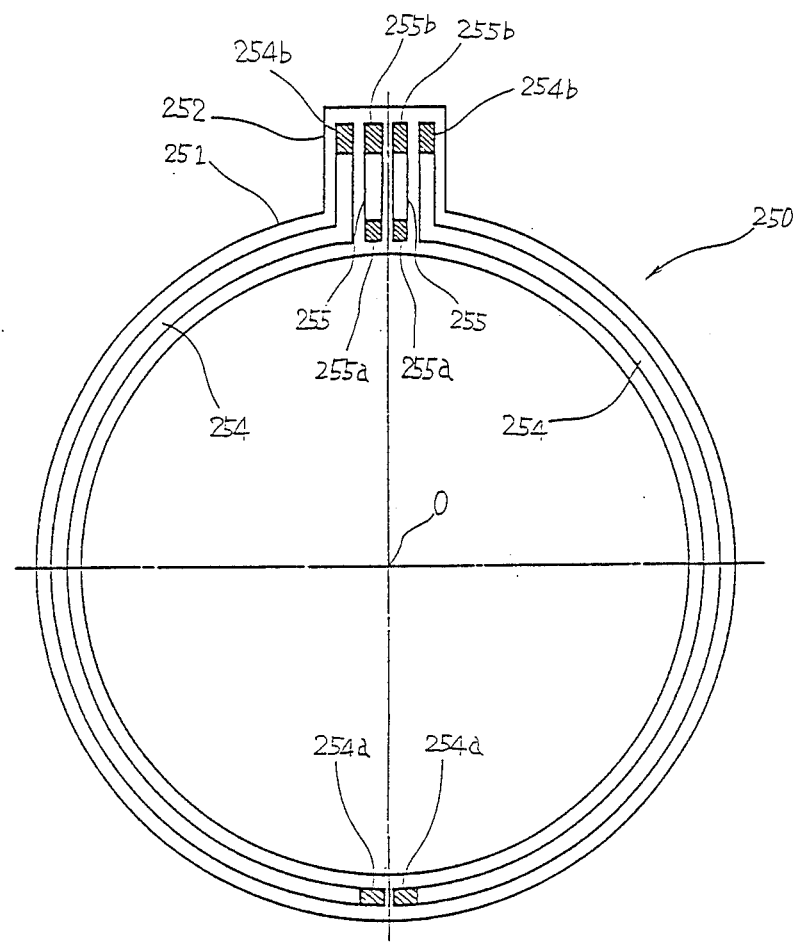
FIG. 11 is a plane view showing a flexible printed circuit used for the unit shown in FIGS. 10(a) and 10(b).

FIG. 10(a) shows another objective lens-driving unit of this invention, which is provided with a flexible printed circuit 250 through which current is supplied to the coils 21 that are the same coils as mentioned in Example 1. The flexible printed circuit 250 comprises, as shown in FIG. 11, a resin substrate 251 of a circular thin plate with a rectangular extension 252 and a pair of conductive substances made of copper, etc., composed of a semicircular portion 254 and a short straight portion 255. The two semicircular portions 254 and the two short straight portions 255 are, respectively, printed on the circular substrate 251 in such a manner that they are disposed symmetrically with respect to the center line of the circular substrate 251. The flexible printed circuit 250 is placed, as shown in FIGS. 10(a) and 10(b), on flat portions 177 of the housing 17. The extension 252 is exposed to the outside of the housing 17 through a hole 177a formed on the side wall of the housing 17. One end of one of the coils 21 is connected to one end 254a of a semicircular conductive portion 254. The other end of the coil 21 is connected to one end 255a of a straight conductive portion 255. The other ends 254b and 255b of the semicircular and the straight portions 254 and 255 are connected to a power source by means of lead wires. In the same way, one end of the other coil 21 is connected to one end 254a of the other semicircular conductive portion 254 and the other end of the coil 21 is connected to one end 255a of the other straight conductive portion 255. The other ends 254b and 255b of the semicircular and the straight portions 254 and 255 are connected to a power source by means of lead wires. Because of the above-mentioned coil configuration, the disposition of the four wires from the coils 21 becomes symmetrically with respect to the center O of the circular substrate 251, so that the weights and stiffnesses of these wires to be imposed on the movable portion 22 at the time when the movable portion 22 moves in a certain direction can be balanced with respect to the center O.

Figure 12:
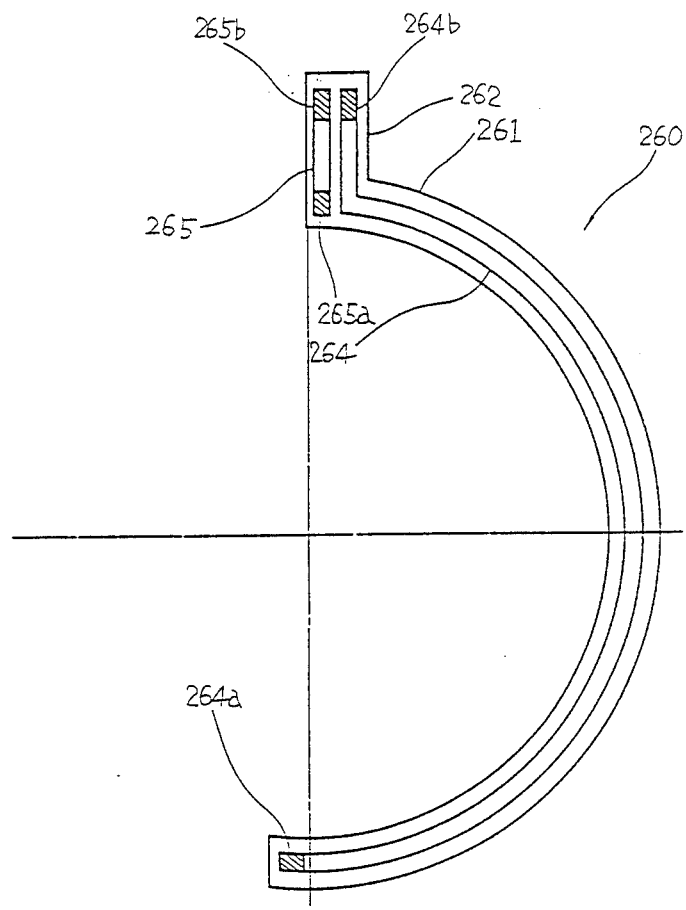
FIG. 12 is a plane view showing another flexible printed circuit.

Although the above-mentioned example only discloses the case in which the coils 21 provide four wires, this invention can apply to the case that two of the four wires are connected in series to each other on, for example, the lens-supporting means 11, resulting in the coils 21 providing two lead wires. In this case, a flexible printed circuit 260 shown in FIG. 12 is used, which comprises a semicircular substrate 261 made of a resin with a rectangular extension 262 positioned at one end of the semicircle and a pair of conductive substances 264 and 265 printed on the substrate 261. Such a flexible printed circuit 260 can be also used for the coils 28, wherein one end of each of the coils 28 is connected to one end 264a of the semicircular conductive portion 264 and the other end of the coil 28 is connected to one end 265a of the straight conductive portion 265 printed on the rectangular extension 262. This flexible printed circuit 260 is, as shown in FIG. 10(a), fixed to the lower flat portion 178 of the housing 17. The extension 262 is exposed to the outside of the housing 17 through a hole 178a formed on the side wall of the housing 17. The other end 264b of the semicircular conductive portion 264 and the other portion 265b of the straight conductive portion 265 are exposed to the outside of the housing 17 through the hole 178a. Current is supplied to the coil 28 through both ends 264b and 265b via external lead wires connected to these ends 264b and 265b.

Example 4

Figure 13:
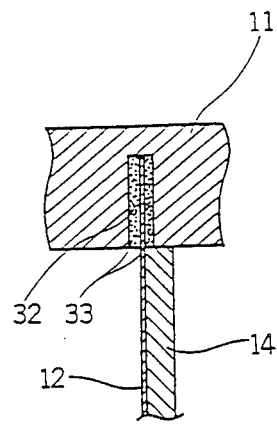
FIG. 13 is a side sectional view showing a fixation of the spring to the spring-supporting means in the objective lens-driving unit shown in FIG. 1.

One end of each of the parallel leaf springs 12 of the unit 1 in Example 1 is fixed to the objective lens-supporting means 11 by positioning the said end into a hole or hollow 32 parallel to the optical axis of the lens 2 by means of an adhesvie 33 and the other end thereof is fixed to the intermediate supporting means 13 by positioning the said end into a hole 34 parallel to the optical axis of the lens 2 by means of an adhesive 35. FIG. 13 is a sectional view showing an enlarged portion of the parallel leaf spring 12.

The outer end of each of the springs 29 is likewise fixed to the housing 17 by positioning the said end into a circular hole or hollow 36 vertical to the optical axis of the lens 2 by means of an adhesive 37 and the inner end thereof is fixed to the intermediate supporting means 13 by positioning the said end into a circular hole 38 vertical to the optical axis of the lens 2 by means of an adhesive 39.

Figure 16A:
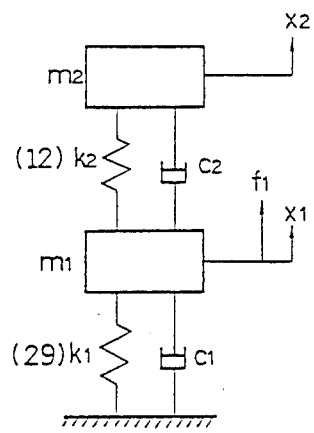
FIG. 16(a) is a schematic diagram showing a model of motion presumed from the structure of the unit shown in FIG. 1.

However, when the above-mentioned leaf springs 12 and 29 are used in the objective lens-driving unit 1 of this invention, if force is applied to the intermediate supporting means 13, the springs 12 and 29 transmit the force to the movable portion 22. At this time, resonance occurs in the springs. A kinetic model in the focusing direction of the unit 1 shown in FIG. 1 is discussed below: As shown in FIG. 16(a), this kinetic model gives rise to vibrations in two different directions, one of which is resonance (a first resonance) arising in the spring 29 in the focusing direction due to the coil 28 and the other of which is resonance (a second resonance) arising in the spring 12 in the focusing direction due to the coil 28. In the drawing, $m_1$ and $m_2$ are the weights of the movable portions including the springs 29 and 12, respectively; $k_1$ is the spring constant in the focusing direction of the spring 29; $k_2$ is the spring constant in the focusing direction of the spring 12; $c_1$ and $c_2$ are the coefficients of viscosity of the springs 29 and 12, respectively; $x_1$ and $x_2$ are the displacements of the said movable portion in the focusing and the tracking directions, respectively; and $f_1$ is the force that is applied to the said movable portion in the focusing direction.

The frequency of the second resonance, $f_{r2}$, is represented by the following formula:

$$f_{r2} \approx \frac{1}{2\pi} \sqrt{\left(\frac{1}{m_1} + \frac{1}{m_2}\right)k_2} \qquad (5)$$

Figure 16B:
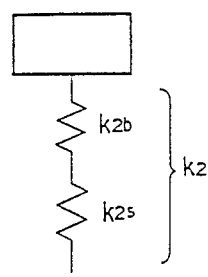
FIG. 16(b) is a schematic diagram showing the spring effect with regard to adhesives in the unit shown in FIG. 1.
Figure 18:
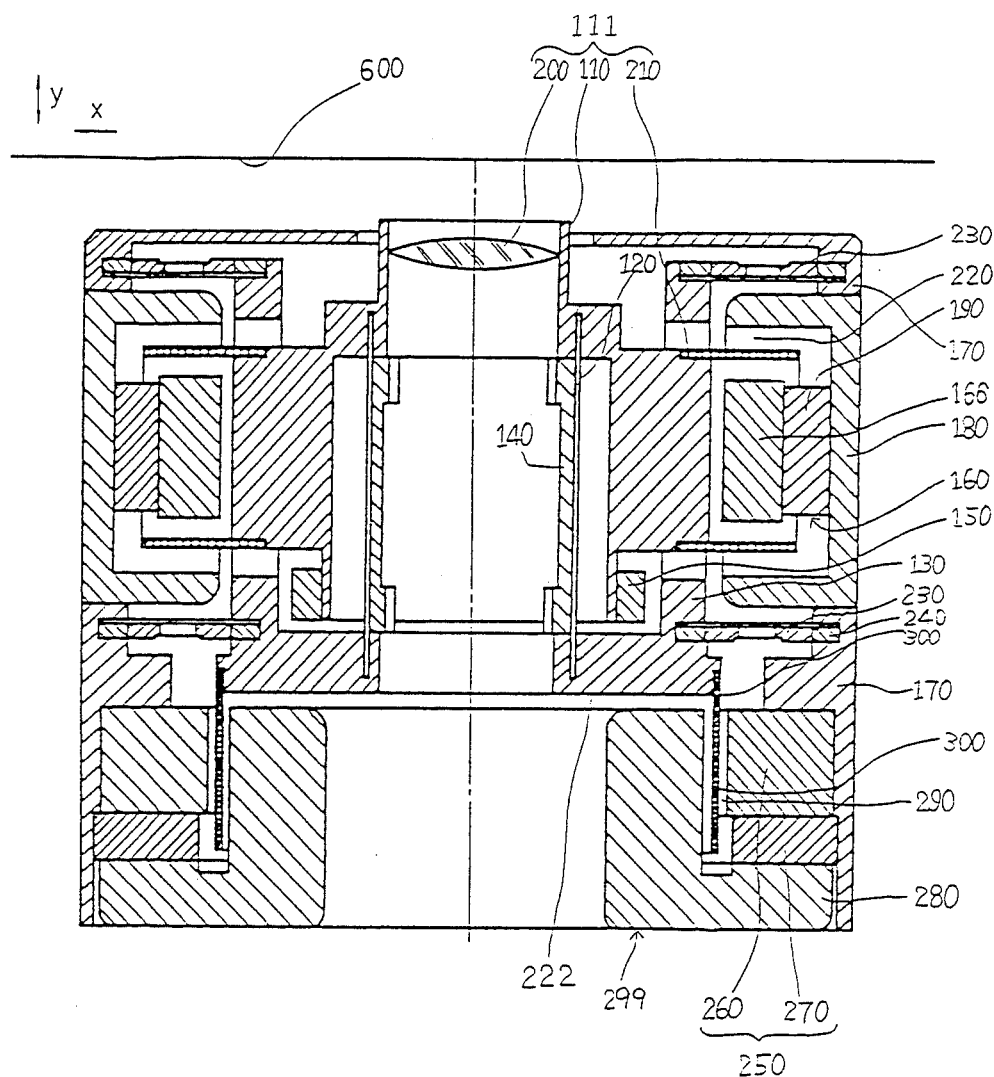
FIG. 18 is a side sectional view showing a conventional objective lens-driving unit.
Figure 19:
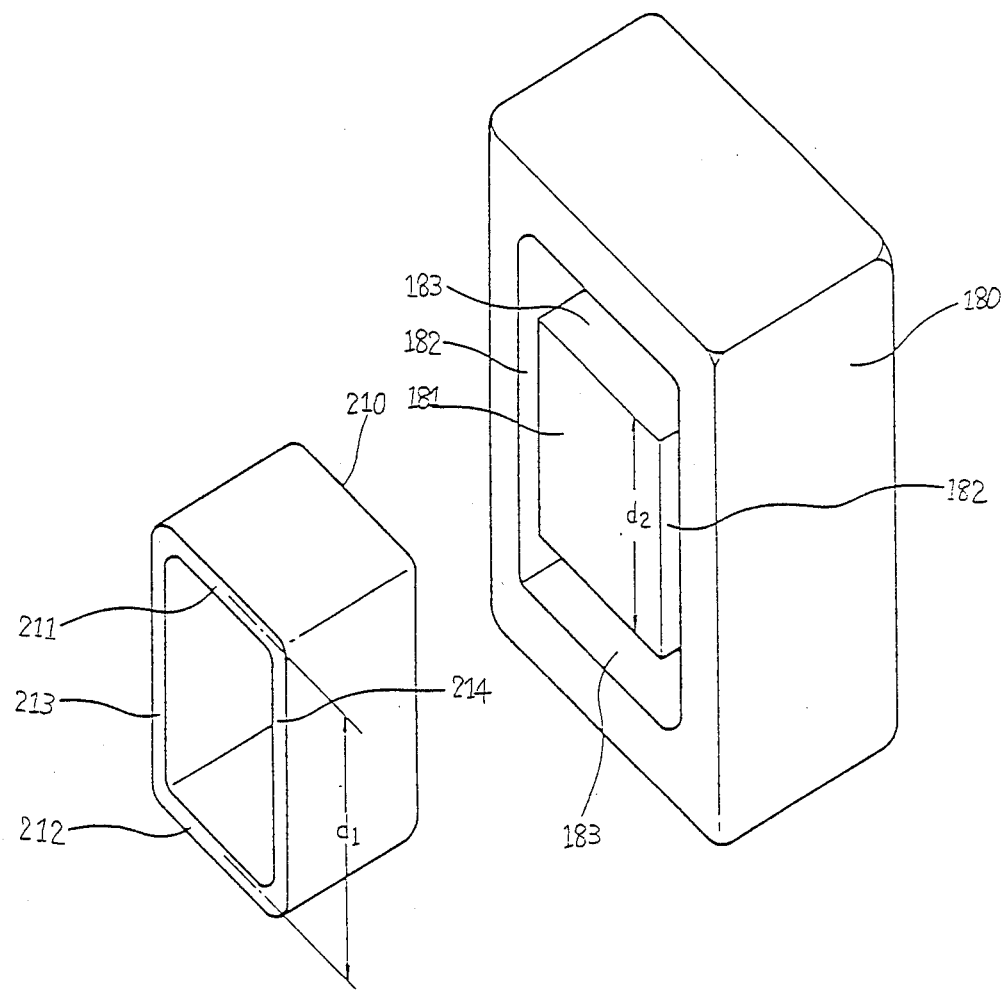
FIG. 19 is a perspective view showing a decomposed driving means used for the unit shown in FIG. 18.
Figure 20:
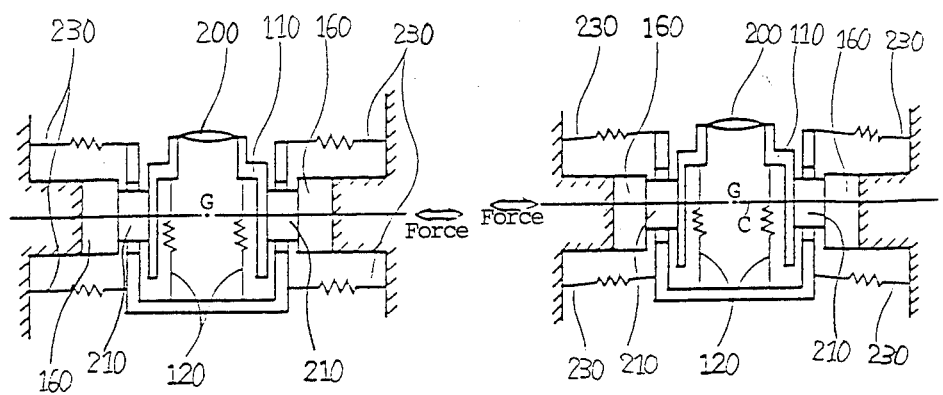
FIG. 20 contains schematic diagrams showing the relationship between the position of the movable portion at which the driving force in the tracking direction acts and the center of gravity of the movable portion with regard to the objective lens-driving unit of this invention shown in FIG. 1.
Figure 21:
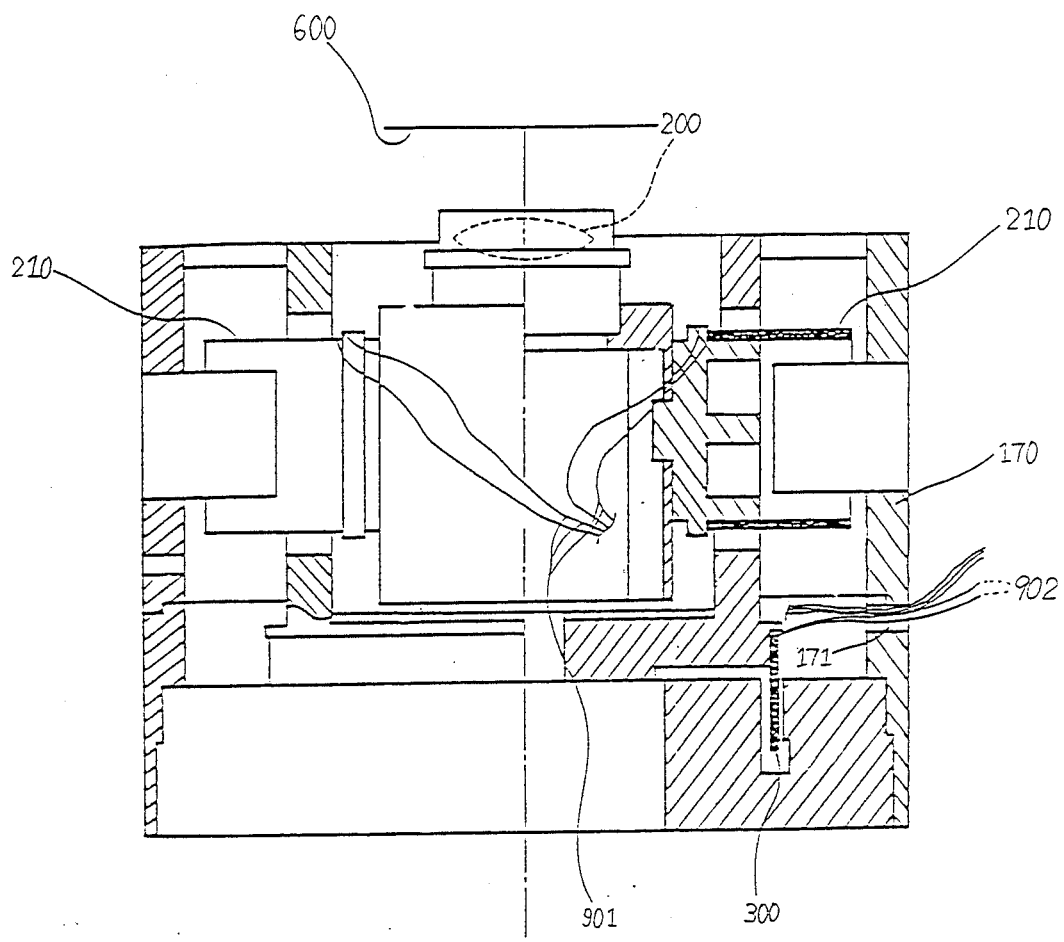
FIG. 21 is a partialy cross sectional view showing the conventional objective lens-driving unit shown in FIG. 18.

Since one end of each of the springs 12 is fixed to the objective lens-supporting means 11 by the adhesive 33 and the other end thereof is fixed to the intermediate supporting means 13 by the adhesive 35, the spring constant $k_2$ is presumed to be composed of the spring constant $k_{2s}$ of the spring 12 in the focusing direction and the spring constant $k_{2b}$ of the above-mentioned adhesives. The spring constant $k_2$ is, thus, presumed to be a spring model in which two springs having the spring constants $k_{2s}$ and $k_{2b}$, respectively, are connected in series to each other as shown in FIG. 16(b). The spring constant $k_2$ can be represented by the following formula:

$$k_2 = \frac{k_{2b} \cdot k_{2s}}{k_{2b} + k_{2s}} \qquad (6)$$

When the value of $k_{2b}$ approaches infinity, $k_2$ approaches $k_{2s}$. This means that if $k_{2b}$ is not set to be sufficiently greater than $k_{2s}$, the spring constant $k_2$ will be reduced by the adhesives. In the unit 1 shown in FIG. 1, it is difficult to form each of the holes 32, 34, 36 and 38 with high accuracy, into which the end of each of the springs 12 and 29 is positioned, so that the sizes of the holes occasionally become large, resulting in adhesive layers with great thicknesses within the said holes, which causes difficulty in obtaining a large value of $k_{2b}$. Therefore, the spring constant $k_2$ becomes small.

Moreover, the value of $k_2$ of some kinds of adhesives depends greatly upon temperatures, resulting in great changes in the frequency of the second resonance, $f_{r2}$.

In order to prevent the above-mentioned phenomena, by which the servosystem of this unit 1 becomes unstable, it is necessary to make the spring constant $k_{2b}$ of the adhesives great. For this purpose, a structure which attains the minimization of the thickness of the adhesive in each of the holes must be provided. Although only the adhesion of the springs 12 to the supporting means 11 and 13 are discussed above, the same problems arise in the adhesion of the springs 29 to the supporting means 13 and 17.

Figure 14:
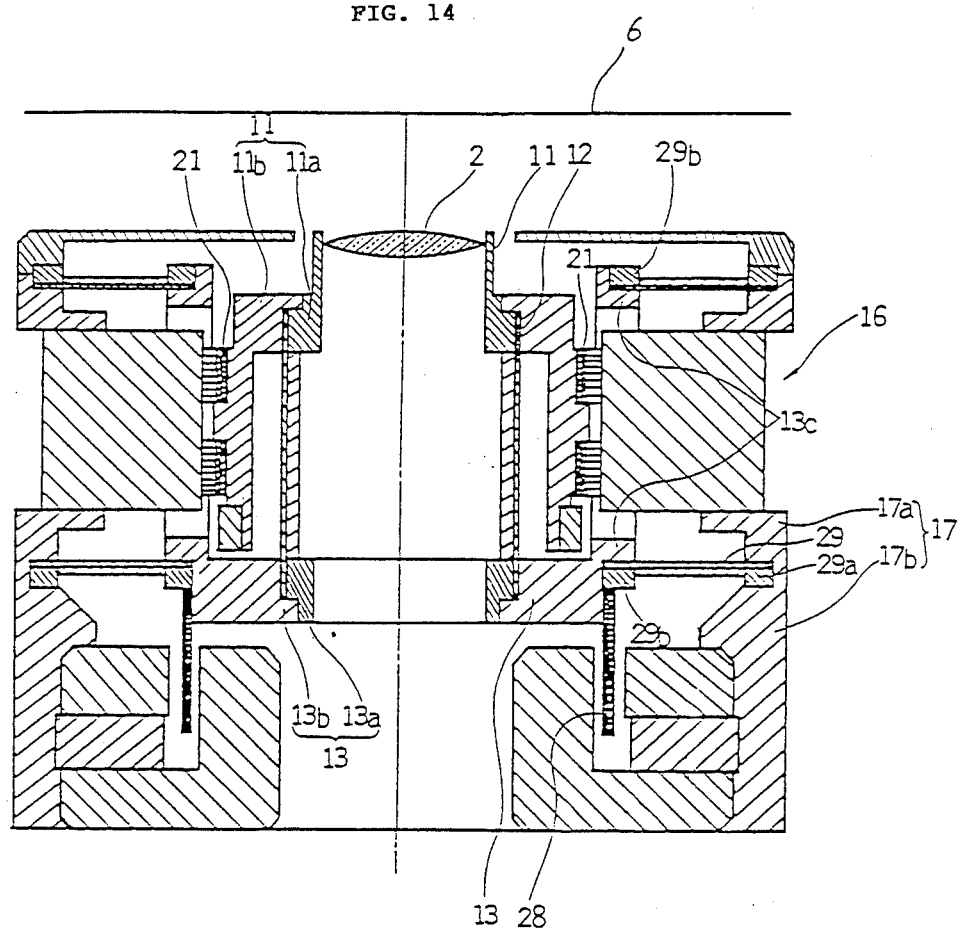
FIG. 14 is a side sectional view showing another objective lens-driving unit of this invention.

FIG. 14 shows an objective lens-driving unit 1 of this invention which overcomes the above-discussed problems. The objective lens-supporting means 11 is composed of two parts, the inner part 11a and the outer part 11b. The upper end of each of the parallel leaf springs 12 is fixed by an adhesive at the interface between the two parts 11a and 11b of the supporting means 11. The portion of the inner part 11a with which each spring 12 comes in contact, and the portion of the outer part 11b with which each spring 12 comes in contact, are processed independently since they can be separated from each other, so that the size of the gap to be formed therebetween can be set depending upon the thickness of the spring 12. This means that the thickness of the adhesive layer to be formed into the gap can be made as small as possible. Thus, it is possible to make the spring constant of the adhesive sufficiently greater than that of the spring 12 in the focusing direction.

The intermediate supporting means 13 is likewise composed of two parts, the inner part 13a and the outer part 13b. The lower end of each of the springs 12 is fixed by an adhesive at the interface between the two parts 13a and 13b of the supporting means 13. The size of the portion of the inner part 13a with which the spring 12 comes in contact and the size of the portion of the outer part 13b with which the spring 12 comes in contact can be also set depending upon the thickness of the spring 12, so that the thickness of the adhesive layer to be formed into the gap between the contact portions can be minimized.

A supporting structure for supporting the other springs 29 is described below:

The housing 17 is composed of two parts, the upper part 17a and the lower part 17b. The outer end of each of the springs 29 is fixed with a pressing ring 29a by an adhesive at the interface between the two parts 17a and 17b. The inner end of each of the springs 29 is fixed by an adhesive at the interface between the outer projection 13c of the intermediate supporting means 13 and the pressing ring 29b.

Figure 15:
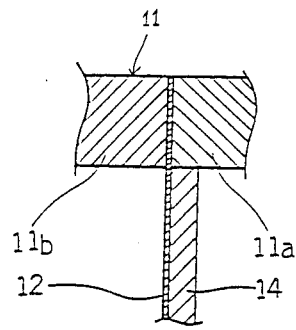
FIGS. 15(a) and 15(b), respectively, are side sectional views showing other fixations of the spring to the spring-supporting means in an objective lens-driving unit of this invention.
Figure 15:
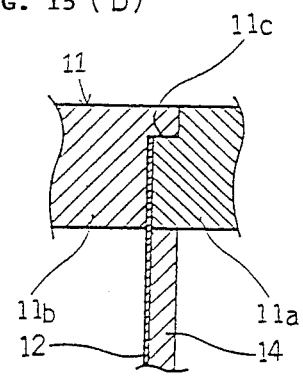

The supporting structure for supporting the springs 12 and 29 is not limited to the above-mentioned. FIG. 15(a) shows another supporting structure therefore, in which one end of the spring 12 is inserted into the objective lens-supporting means 11 in such a manner that the top of the end is exposed to the outside of the supporting means 11. FIG. 15(b) shows another supporting structure, in which the objective lens-supporting means 11 is constructed such that the inner part 11a and the outer part 11b can be separated from each other so as to form into a step 11c. The top of one end of the spring 12 comes in contact with the step 11c. Accordingly, the step 11c functions as a positioning means for the spring 12, which allows accurate positioning of the spring 12. The above-mentioned structures can be, of course, applied to the springs 29.

It is understood that various other modifications will be apparent to and can be readily made by those skilled in the art without departing from the scope and spirit of this invention. Accordingly, it is not intended that the scope of the claims appended hereto be limited to the description as set forth herein, but rather than the claims be construed as encompassing all the features of patentable novelty that reside in the present invention, including all features that could be treated as equivalents thereof by those skilled in the art to which this invention pertains.

What is claimed is:

1. An objective lens-driving unit comprising a lens supporting means for supporting the objective lens having an optical axis vertical to a recording medium on which light beams converge through the objective lens so as to attain optical recording, optical playing and optical erasing of information on the recording medium; an intermediate supporting means for supporting said lens supporting means by use of springs that are movable in the tracking direction; a fixed supporting means for supporting said intermediate supporting means by use of springs that are movable in the focusing direction; at least one driving means for driving said lens supporting means in the tracking direction, said tracking direction-driving means being positioned between said fixed supporting means and said lens supporting means; a driving means for driving said intermediate supporting means in the focusing direction, said focusing direction driving means being positioned between said fixed supporting means and intermediate supporting means, wherein said tracking direction-driving means comprises a magnetic circuit that produces magnetic flux in the circumferential direction of the recording medium, and a tracking direction-driving coil that is positioned to cross a gap formed in the magnetic circuit to thereby receive an electro-magnetic force due to an interaction between the magnetic field of the magnetic circuit and the current passing through said coil, said tracking direction-driving coil being positioned within the excitation area of the magnetic circuit even when said coil moves in the focusing direction.

2. An objective lens-driving unit according to claim 1, wherein said focusing direction driving means comprises a magnetic circuit with a gap and a focusing direction-driving coil positioned to cross said gap to thereby receive an electro-magnetic force in the focusing direction due to an interaction between the magnetic field of the magnetic circuit and the current passing through said coil.

3. An objective lens-driving unit according to claim 2, wherein a velocity-detecting coil is laid upon said tracking direction-driving coil and/or said focusing direction-driving coil, thereby attaining the detection of the velocity of the driving of the tracking direction-driving coil and/or the focusing direction-driving coil.

4. An objective lens-driving unit according to claim 1, wherein a velocity-detecting coil is laid upon said tracking direction-driving coil and/or said focusing direction-driving coil, thereby attaining the detection of the velocity of the driving of the tracking direction-driving coil and/or the focusing direction-driving coil.

5. An objective lens-driving unit according to claim 1, wherein at least one flexible printed circuit is disposed on said fixed supporting means in such a manner that one end of the flexible printed circuit is exposed to the outside of the fixed supporting means, lead wires led from at least one selected from said tracking direction-driving coil and said focusing direction-driving coil being connected to said flexible printed circuit and wires through which current is supplied to said coil being connected to said exposed portion.

6. An objective lens-driving unit according to claim 1, wherein the portion(s) of at least one selected from said lens supporting means, said intermediate supporting means and said fixed supporting means, to which one end or both ends of each of said springs is fixed, is separable into two parts.

7. An objective lens-driving unit according to claim 6, wherein at least one end of each of said springs are fixed to at least one of said supporting means by an adhesive in a manner to be positioned between the two parts.

* * * * *